March 3, 1959     G. A. SMITH     2,875,507

METHOD OF MAKING MAGNETIC THREE-PHASE CORES

Filed Oct. 20, 1955     2 Sheets-Sheet 1

INVENTOR
GEORGE A. SMITH
BY
Weatherford & Weatherford

March 3, 1959     G. A. SMITH     2,875,507
METHOD OF MAKING MAGNETIC THREE-PHASE CORES
Filed Oct. 20, 1955     2 Sheets-Sheet 2
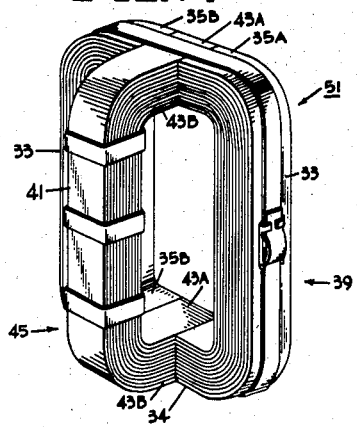
FIG.7.
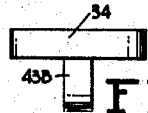
FIG.8.
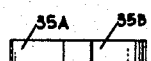
FIG.9.
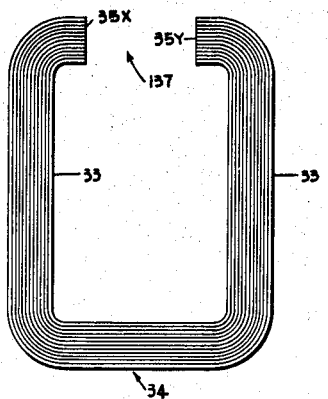
FIG.12.
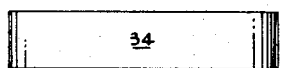
FIG.10.
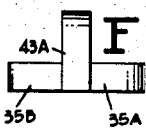
FIG.11.
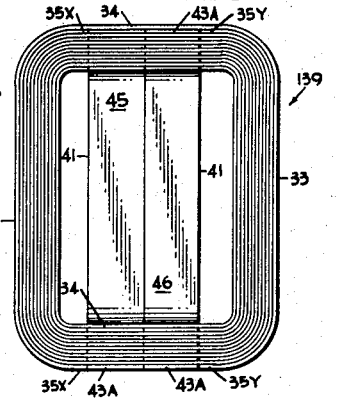
FIG.13
FIG.14.
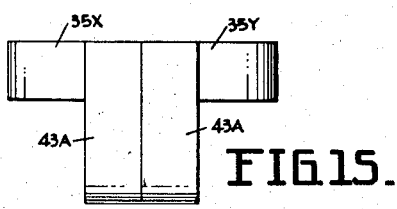
FIG.16.
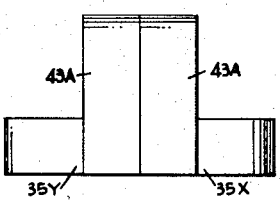
FIG.17.
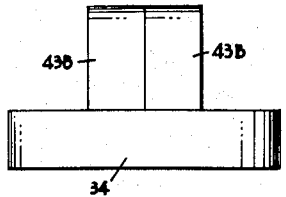
FIG.15.
INVENTOR
GEORGE A. SMITH
BY
Weatherford & Weatherford United States Patent Office 2,875,507
Patented Mar. 3, 1959

2,875,507

METHOD OF MAKING MAGNETIC THREE-PHASE CORES

George A. Smith, Pine Bluff, Ark., assignor to Central Transformer Corporation, Pine Bluff, Ark., a corporation of Arkansas Application October 20, 1955, Serial No. 541,806

7 Claims. (Cl. 29—155.57)

This invention relates to certain new and useful improvements in three-phase core structures for use with transformers and other induction equipment, and also relates to a method of making such cores.

This application is a division of my copending application Serial No. 474,837, filed December 13, 1954.

More particularly the present invention relates to certain new and useful improvements in T-core structures for transformers and specifically relates to a T-core structure which is characterized by a compactness of jointing and the close relationship between the parts of the transformer core and to the method by which such device is produced.

The present invention is further adapted for the production of a T-core for transformers having three parallel winding legs in which each of the legs is of substantially uniform size relatively, and may also be employed for producing a T-core for transformers in which the third leg is of a cross-sectional area substantially double the cross-sectional areas of each of the other legs and is disposed in a relatively wide split leg comprising substantially twice the cross-sectional area of a single winding leg, and in which the thickness of the joint structure is substantially equal to the thickness of an individual winding leg.

The present invention is particularly adapted for producing a compact structure with highly efficient jointing and which may be easily and simply constructed with a minimum of effort as well as with an economical use of the magnetic strip material of which it is preferably formed.

It has heretofore been considered desirable in many instances to increase the bulk of the magnetic material in the yoke joint areas in an attempt to minimize magnetic losses due to separations of the sheet material employed. It is found that with the employment of the jointing of the present invention the employment of additional magnetic material in the jointing area is unnecessary and that the present arrangement is capable of maintaining magnetic losses at a minimum, as well as maintaining a low noise level, resulting in a compact device of relatively small dimension, the thickness of the jointing not exceeding the thickness of an individual winding leg, yet overcoming the losses and undesirable characteristics which have heretofore attended such jointing as butt joints of third leg layers against edge portions of other core layers.

The principal object of the invention is to provide a new and novel method of fabricating three-phase cores for transformers.

A further object of the invention is to provide a method of fabricating three-phase cores for transformers which includes the steps of winding a coil of magnetic strip material upon a keystone mandrel, dividing the coil along the shortest of its sides to produce a series of lamination layers, spreading the layers successively into substantially rectangular form with a gap along one of the short sides of the substantially rectangular form, nesting said gapped lamination layers into a substantially rectangular stack of laminations, each including a gap, and successively inserting end portions of U-shaped lamination layers into jointed relationship with said gapped portions.

A further object of the invention is to provide such a method for fabricating transformer cores which additionally includes the steps of successively and alternately positioning the said gapped sides of the rectangular lamination layers at opposite ends of the rectangular stack of lamination layers.

A further object of the invention is to provide a method of fabricating three-phase cores for transformers which additionally includes the step of forming a bundle of substantially U-shaped lamination layers in which one end portion of each said U-shaped lamination layer exceeds in length the opposite end portion of the layer.

A further object of the invention is to provide a method of fabricating three-phase cores for transformers which includes the step of inserting one end of a U-shaped lamination layer in a gap formed in a substantially rectangular lamination layer, abutting the free ends of the rectangular lamination layer against the sides of the inserted end of the U-shaped lamination layer and additionally abutting the opposite end of the U-shaped lamination layer against an edge portion of the rectangular layer.

A further object of the invention is to generally improve the facility and efficiency in methods of fabricating three-phase cores for transformers.

The means by which the foregoing and other objects of the present invention are accomplished and the manner of their accomplishment will readily be understood from the following specification upon reference to the accompanying drawings, in which:

Fig. 7 is a perspective view of a three-phase core for transformers formed from the rectangular stack of layers of Fig. 5 and a U-shaped bundle, as of Fig. 6.

Fig. 8 and 9 are respectively top plan views on a reduced scale illustrating the successive assemblies of the lamination layers in the yoke section of the core structure of Fig. 7.

Figs. 10 and 11 are inverted plan views illustrating the successive assemblies of the opposite end portions of the lamination layers in the opposite yoke portion of the core of Fig. 7, Fig. 10 being an opposite end view of the layers of Fig. 8, and Fig. 11 being an opposite end view of the layers of Fig. 9.

Fig. 12 is a view similar to Fig. 2 illustrating an alternative in the severing and spreading of a keystone coil to divide the coil into lamination layers.

Fig. 13 is a front view of a three-phase core for transformers in modified form fabricated from the rectangular layers of Fig. 12 and a pair of U-shaped bundles as of Fig. 6.

Figs. 14 and 15 are respectively top plan views illustrating the successive assembles of lamination layers in one yoke section of the core structure of Fig. 13.

Figs. 16 and 17 are inverted plan views illustrating the successive assemblies of the opposite end portions of the lamination layers in the opposite yoke portion of the core of Fig. 13, Fig. 16 being an opposite end view of the layers of Fig. 14, and Fig. 17 being an opposite end view of the layers of Fig. 15.

Figure 1:
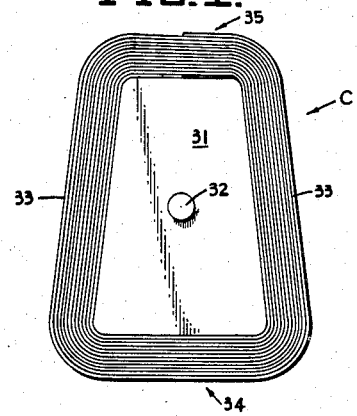
Fig. 1 is a front view of a substantially keystone-shaped coil of magnetic strip material illustrated as mounted upon a suitable mandrel.

Referring now to the drawings in which the various parts are indicated by numerals, it will be seen that the present invention relates to a three-phase core for transformers formed from laminated magnetic strip material and preferably relates to such transformers having a substantially T-shape in the yoke portions thereof. The term "lamination layer" is used herein to refer to the individual layers since one or more laminations of magnetic strip material may be included in each of the said layers.

Preferably magnetic strip material of suitable width and preferably of a suitable magnetic metal, in which the grain is oriented in the desired direction of magnetic flux flow lengthwise of the strip, is withdrawn from a source of supply, not shown. Such strip material is introduced to and engaged with a substantially keystone-shaped mandrel 31 which is preferably rotatably supported as by a shaft 32. The strip material preferably is wound upon the mandrel 31, as by rotation of the mandrel, to form a substantially keystone-shaped coil C comprising a plurality of lamination layers, each including opposite sides 33 forming legs consisting of the long sides of the keystone, a major short side 34 and a shorter or minor short side 35.

The coil C after removal from mandrel 31 is severed through minor side 35 substantially along the center line of the coil dividing the minor side 35 into substantially equal length end portions 35A, 35B. The severing of short side 35 divides coil C into a nested plurality of independent lamination layers. The layers are spread, as best shown in Fig. 2, to substantially rectangular shape with legs 33 of the layers substantially at right angles to uninterrupted ends 34 and with the divided end portions 35A, 35B projecting substantially at right angles from the opposite ends of the respective legs.

It will be observed that when lamination layers are thus spread to substantially rectangular form, the gap 37 between the respective layer portions 35A, 35B is of a width substantially equal to the preferred width of strip material employed. It also will be observed that the severing of side 35 is preferably such that when the layers are spread to rectangular form the free ends of the layer portions 35A, 35B respectively lie in substantially parallel planes which are also substantially parallel to the legs 33.

Figure 2:
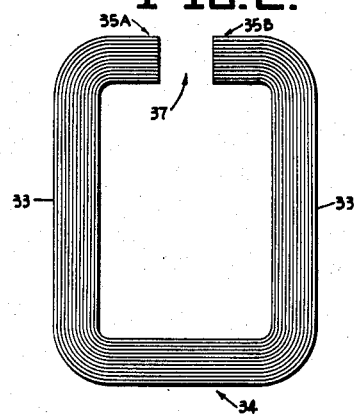
Fig. 2 is a face view of a keystone coil, as the coil of Fig. 1, with the shortest side of the coil severed and spread to provide one embodiment of lamination layers.
Figure 3:
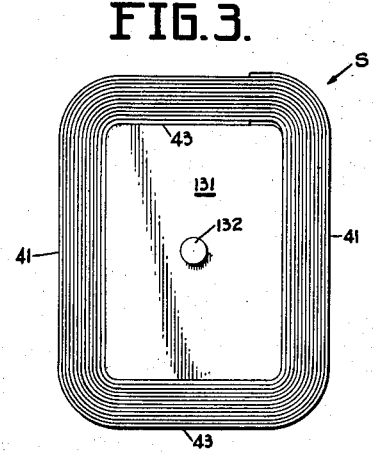
Fig. 3 is a face view of a substantially rectangular coil of a magnetic strip material shown as wound upon a suitable mandrel.
Figure 5:
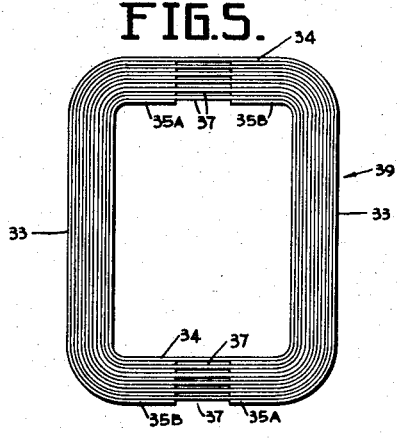
Fig. 5 is a face view of a rectangular stack of lamination layers formed from the layers of Fig. 2, in one embodiment of the invention.

Preferably the rectangular lamination layers of Fig. 2 are unnested from the arrangement shown in Fig. 2 and are reassembled into a substantially rectangular stack 39, as shown in Fig. 5, in which the gaps 37 of alternate layers in the stack are positioned in one end of the stack and the gaps 37 of the remaining layers of the stack are positioned in the opposite end of the stack. As thus arranged each gap 37 is bridged by an uninterrupted portion 34 and thus the layers in the respective opposite end portions alternately including unbroken layers and gapped layers. The rectangular stack 39 thus formed provides a pair of winding legs made up of the layer legs 33 and a pair of opposite yoke portions interconnecting the legs, each of the yoke portions, as stated, consisting of alternate unbroken layers 34 and gapped layers 35A, 35B.

Preferably additional similar magnetic strip material, having width and magnetic characteristics like that described, is withdrawn from the source of supply, not shown, and is introduced to and engaged with a substantially rectangular mandrel 131 which is preferably rotatably supported as by a shaft 132. The strip material preferably is wound upon mandrel 131, as by mandrel rotation, to form a substantially rectangular spiral coil S comprising a plurality of lamination layers, each including opposite long sides 41, providing leg portions, and opposite substantially equal short sides 43.

The coil S, after removal from mandrel 131, is severed through a short side, as the upper short side 43, along a line laterally offset to one side of the longitudinal of coil S dividing the side 43 into major length end portions 43A and minor length end portions 43B. The opposite short side 43 is similarly severed along a line equally laterally offset to the opposite side of the longitudinal center line of coil S dividing the side into major length end portions 43A and minor length end portions 43B. Thus the coil S is severed into a pair of U-shaped bundles of lamination layers, in which each layer includes a leg portion 41, a major length end portion 43A connected to one end of the leg portion and a minor length end portion 43B connected to the opposite end of the leg portion.

It will be observed that the major end portions 43A extend from the leg portions to which they are connected a distance greater than the extent of the minor end portions by an amount equal to the width of the strip material.

Figure 4:
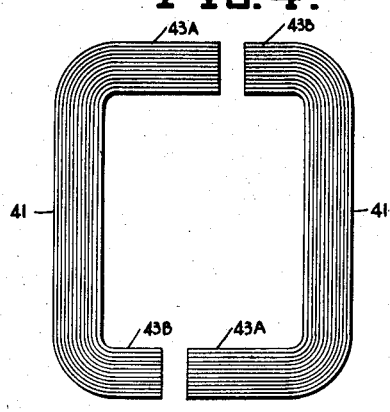
Fig. 4 is a face view of a rectangular coil, formed as in Fig. 3, and severed along its opposite short sides and oppositely offset from the coil center line, to produce U-shaped lamination layers.
Figure 6:
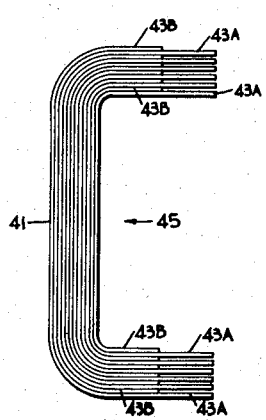
Fig. 6 is a view of a substantially U-shaped bundle of lamination layers formed from the lamination layers of Fig. 4 in the preferred embodiment thereof.

In the fabrication of a three-phase core structure, as shown in Fig. 7, one of the bundles of U-shaped lamination layers, as described, is unnested from the condition shown in Fig. 4, and is reassembled to form a U-shaped bunlde 45, as shown in Fig. 6. In forming the bundle shown in Fig. 6, the respective lamination layers are stacked in nested relationship with alternate major length end portions being positioned in opposite ends of the bundle. Thus as shown in Fig. 6, the upper end section of bundle 45 includes minor end portions 43B in alternate layers and major end portions 43A in alternate layers, and similarly the lower end portion of the bundle of Fig. 6 includes oppositely alternated major end portions 43A and minor end portions 43B. The bundle 45 thus assembled, with the end portions alternated, provides a core winding leg made up of the layer legs 41 and a pair of opposite yoke portions positioned substantially at right angles to the winding leg, each of the yoke portions consisting of the alternated or staggered length major and minor portions.

The bundle 45 of U-shaped laminations thus assembled is introduced to the rectangular stack 39. The extending ends of end portions 43A are respectively inserted in the gaps 37 of the lamination layers of stack 39. When so inserted the major end portions 43A substantially fully overlap the width of adjacent unbroken yoke portions 34 and lie in face engagement with the portions 34 substantially throughout the width of the strip material. In addition, the side edges of the extending end of bundle layer portions 43A are abutted by the free ends of stack layer portions 35A, 35B, as shown in Figs. 9 and 10. With the layer portions 43A thus inserted in the layer gaps 37 the ends of minor length end portions 43B are moved into abutting engagement with edges of the unbroken yoke portions 34, as shown in Figs. 8 and 11.

By way of example, the relationship of the parts in each of the layers of the assembled core is illustrated in Figs. 8 to 11 inclusive. Thus in Fig. 8 a first layer level at one yoke portion of the core is illustrated with the unbroken stack layer portion 34 abutted in a butt joint by the end of a bundle minor end portion 43B. The relationship of the lamination layers comprising the layer level of Fig. 8 in the opposite yoke portion of the core is illustrated in Fig. 10, showing the major length bundle end portion 43A inserted between the stack layer portions 35A, 35B, with the free ends of portions 35A, 35B abutting against the opposite edges of end portion 43A.

Fig. 9 illustrates the relationship of a next adjacent layer level in the same core yoke portion as of Fig. 8, it being observed that the relationship in the adjacent level shown in Fig. 9 is substantially identical with the relationship shown in Fig. 10 and just described, with the end of portion 43A inserted between and abutted by the free ends of stack layer portions 35A, 35B. The relationship of the opposite ends of the layer level of Fig. 9 in the opposite yoke portion of the core, that is the same yoke portion as of Fig. 10, shows a condition substantially identical with that of Fig. 8 with the end of bundle portion 43B abutted against the edge of unbroken stack portion 34.

It will be observed that each of the U-shaped lamination layers of bundle 45 thus has one end inserted between and having its edges engaged by the ends of a rectangular stack layer, while the opposite end of such U-shaped lamination layer is abutted against an edge portion of the unbroken part of the rectangular lamination layer. It further will be seen that adjacent joints between the ends of stack layer portions 35A, 35B and U-shaped layer portions 43A are bridged and overlapped by the adjacent unbroken stack layer portions 34, and in addition the butt joint between the minor length end portions 43B and stack layer portions 34 is bridged and overlapped by the adjacent major end portions 43A. It thus will be seen that a superior jointing is provided while maintaining the compactness of material in the joint, eliminating the necessity of supplementing the magnetic material in the joint. There is thus produced a three-phase core 51 having its yoke structure substantially in the form of a T with which suitable phase windings, not shown, may be associated during the assembly of the stack and bundle, or applied to the winding legs otherwise.

In Fig. 12 a variation in the handling of a coil such as the keystone-shaped coil C is shown for producing a modification in the present invention. In this variation a coil such as coil C may be severed along its minor short side 35, and a section of the side 35 having a length substantially equal to the width of the strip material may be removed therefrom, severing the coil into a nested series of progressively enlarging lamination layers, each having opposite leg portions 33, a major unbroken short side 34, and opposite minor portions 35X, 35Y. The lamination layers thus produced may be spread into substantially rectangular form in which each of the lamination layers includes a gap 137 between the free ends of the layer portions 35X, 35Y, the gaps 137 being of a width of the nature of twice the width of the strip material.

The lamination layers thus produced are preferably unnested from the condition shown in Fig. 12 and are renested into a substantially rectangular stack 139. The lamination layers are successively positioned with the gaps 137 of alternate layers positioned in one end of the stack, and the gaps 137 of the remaining layers of the stack positioned in the opposite side end of the stack. As in the case of gaps 37 of stack 39, the gaps 137 of stack 139 are each bridged by uninterrupted portions 34, and the layers in the respective opposite end portions are composed of alternate unbroken layer portions and gapped layers. The stack 139 thus formed provides a pair of winding legs made up of the layer legs 33, and a pair of opposite yoke portions interconnecting the legs, each of the yoke portions consisting of alternate unbroken layers 34 and gapped layers 35X, 35Y.

A second bundle 46 of U-shaped laminations, like the bundle 45 shown in Fig. 6, may be formed, as for example by arranging the other bundle of lamination layers, mentioned above as produced by severing the coil S, into a U-shaped bundle 46 substantially identical with bundle 45 in which the respective lamination layers are stacked in nested relationship with alternate major length end portions positioned in opposite ends of the bundle. The bundle 46 thus includes leg portions 41 with which are joined minor end portions 43B and major end portions 43A, each of the end sections of the bundle 46 including the major and minor length end portions in alternate relationship. Bundle 46 thus assembled provides a winding leg made up of layer legs 41 and a pair of opposite yoke portions positioned substantially at right angles to the winding leg, each of the yoke portions consisting of the alternated major length and minor length end portions.

Bundle 46 is positioned with the alternate length end portions corresponding to the position of the alternate length end portions in bundle 45, and the bundles 45, 46 may be brought into proximate edge engagement. As thus engaged the extending major length end portions 43A of the respective bundles may be inserted side by side into the double width gaps 137, the proximate edges of the major length end portions being in edge engagement as stated, and the remote edges of the major length end portions being abutted by the free ends of layer portions 35X, 35Y. In each instance this jointing is bridged and overlapped by the unbroken extent of one or more stack layer portions 34. Additionally the ends of minor length end portions 43B are abutted against edge portions of the unbroken stack layer portions 34, each of these butt joints thus formed being bridged and lapped by a major length end portion 43A.

In Figs. 14 to 17 are illustrated separately the relationships of the layer parts in adjacent layer levels of the core yoke portions. Thus in Fig. 14 is shown the relationship of the lamination layer parts in one layer level of one core yoke portion, the relationship of the lamination layer parts of the same layer level in the opposite yoke portion being shown in Fig. 16, and similarly the relationships of the lamination layer parts at an adjacent layer level are shown in Figs. 15 and 17 respectively in the opposite yoke portions of the core 15 lying in the same core yoke as Fig. 14, and Fig. 17 in the same core yoke as Fig. 16. It will be seen that in Figs. 14 and 17 unbroken stack layer portions 34 are abutted by the ends of bundle minor end portions 43B, while in Figs. 15 and 16 the extending ends of bundle major end portions 43A are inserted in gaps 137 between stack layer portions 35X, 35Y and are abutted thereby.

It thus will be seen that a modified three-phase core structure 151 is produced which has its yoke structure substantially in the form of a T, and which comprises three winding legs, one of which is of a width double the width of each of the other winding legs and in which the jointing in the yoke portions is of a thickness not exceeding the thickness of an individual winding leg. Suitable phase windings, not shown, may be associated in desired manner with the winding legs of core 151.

It will be understood that while the gaps 137 have been described as provided by removing strip material from a keystone coil C, a coil may be wound upon a mandrel of approximately triangular shape, with the coil cut through substantially at the apex of the substantially triangular shape and spread apart to produce stack lamination layers as shown in Fig. 12, including a double width gap 137.

It will be observed that the magnetic strip material, which is of resilient material, is preferably spread in the formation of the rectangular lamination layer stacks and the resiliency of the material urges the severed ends toward each other, thus enhancing the abutting of the bundle layer end portions of the free ends of the severed stack layers.

I claim:

1. In a method of fabricating cores for transformers, the steps which comprise winding magnetic strip material to form a keystone-shaped coil, severing said coil through the middle of and perpendicular to the lesser short side thereof to provide said coil into a plurality of nested discontinuous lamination layers, each including a severed side, unnesting said layers and renesting said layers in a substantially rectangular stack with alternate said layers reversed end for end from their original position relative to the other said layers, spreading the severed layer sides in said stack to provide a gap in each said layer, forming of magnetic strip material a substantially U-shaped bundle of lamination layers having a width equal to the width of the gap in each said stack layer, said bundle layers having alternately projecting ends, inserting one projecting end of each U-shaped layer in said gaps, abutting the severed ends of the stack layers against the opposite sides of said inserted ends, to join said U-shaped layers at one end with said stack layers, and abutting the other end of each U-shaped layer with said stack layers respectively opposite to the joints formed with said inserted ends.

2. In a method of fabricating cores for transformers, the steps including winding magnetic strip material into a keystone-shaped coil comprising a plurality of continuously interconnected lamination layers, severing said coil across the middle of and perpendicular to the lesser short side of said coil to produce a plurality of nested, independent lamination layers, each having a severed portion, the remainder of each said severed layer being uninterrupted, unnesting said independent lamination layers, stacking said unnested layers into a substantially rectangular stack with said severed layer portions alternately positioned at opposite ends of said stack, spreading said severed portions during said stacking thereby providing a gap in each said stack layer between the severed ends of said severed stack layer portions, winding magnetic strip material into a substantially rectangular spiral coil having opposite short sides and opposite long legs, severing said spiral coil across its opposite short sides to produce a plurality of substantially U-shaped flatwise bent lamination layers each having a leg portion, a minor end portion and a major end portion of a length greater than the length of the minor portion, forming of said U-shaped layers a substantially U-shaped bundle of lamination layers, alternately reversing the relative positioning of said U-shaped layers during forming of said bundle to position alternate major end portions at opposite ends of the bundle, whereby the bundle includes staggered length end portions, successively inserting said major end portions in said stack layer gaps and abutting said minor end portions against edge portions of uninterrupted stack portions opposite to said severed portions, and abutting said severed ends against the side edges of said inserted major end portions.

3. In a method of fabricating cores for transformers, the steps including producing a series of progressively enlarging, independent, substantially keystone-shaped lamination layers of magnetic strip material, each having a severed portion comprising the shorter parallel side of the keystone and otherwise being uninterrupted, stacking said layers into a substantially rectangular stack with said severed layer portions alternately positioned at opposite ends of said stack, spreading said severed sides during said stacking thereby providing a gap in each said stack layer between the severed ends of said severed stack layer portions, producing a plurality of substantially U-shaped flatwise bent lamination layers of magnetic strip material each having a leg portion, a minor end portion and a major end portion of a length greater than the length of the minor portion, forming of said U-shaped layers a substantially U-shaped bundle of lamination layers, alternately reversing the relative positioning of said U-shaped layers during forming of said bundle to position alternate major end portions at opposite ends of the bundle whereby the bundle includes staggered length end portions, successively inserting said major end portions in said stack layer gaps and abutting said minor end portions against edge portions of said uninterrupted stack layer portions, and abutting said severed ends against the side edges of said inserted major end portions.

4. In a method of fabricating cores for transformers, the steps including winding magnetic strip material into a keystone-shaped coil comprising a plurality of continuously interconnected lamination layers, severing said coil across the center of and perpendicular to the lesser short side of said coil to produce a plurality of nested, independent lamination layers, each having a severed portion and being otherwise uninterrupted, stacking said layers into a substantially rectangular stack, spreading said severed sides during said stacking thereby providing a gap in each said stack layer between the severed ends of said severed stack layer portions, alining said gaps with said severed ends respectively equidistant from the center of said lesser short sides, winding magnetic strip material into a substantially rectangular spiral coil, severing said spiral coil across its opposite short sides to produce a plurality of substantially U-shaped flatwise bent lamination layers each having a leg portion, a minor end portion and a major end portion of a length greater than the length of the minor portion, forming of said U-shaped layers a substantially U-shaped bundle of lamination layers, successively inserting said major end portions in said stack layer gaps and abutting said minor end portions against edge portions of uninterrupted stack portions opposite to said severed portions, and abutting said severed ends against the side of said inserted major end portions.

5. In a method of fabricating cores for transformers, the steps including winding magnetic strip material into a keystone-shaped coil comprising a plurality of continuously interconnected lamination layers, severing said coil across the middle of and perpendicular to the lesser short side of said coil to produce a plurality of nested, independent, lamination layers, each having a severed portion, the remainder of each severed layer being uninterrupted, unnesting said independent lamination layers, stacking said unnested layers into a substantially rectangular stack with said severed layer portions alternately positioned at opposite ends of said stack, spreading said severed portions during said stacking thereby providing a gap in each said stack layer between the severed ends of said severed stack layer portions, producing a plurality of substantially U-shaped flatwise bent lamination layers each having a leg portion, a minor end portion and a major end portion of a length greater than the length of the minor portion, forming of said U-shaped layers a substantially U-shaped bundle of lamination layers, alternately reversing the relative positioning of said U-shaped layers during forming of said bundle to position alternate major end portions at opposite ends of the bundle, whereby the bundle includes staggered length end portions, successively inserting said major end portions in said stack layer gaps and abutting said minor end portions against edge portions of uninterrupted stack portions opposite to said severed portions, and abutting said severed ends against the side edges of said inserted major end portions.

6. In a method of fabricating cores for transformers, the steps including winding magnetic strip material into a keystone-shaped coil comprising a plurality of continuously interconnected lamination layers, severing said coil across the middle of and perpendicular to the lesser short side of said coil to produce a plurality of nested, independent, lamination layers, each having a severed portion, the remainder of each said severed layer being uninterrupted, unnesting said independent lamination layers, stacking said unnested layers into a substantially rectangular stack with said severed layer portions alternately positioned at opposite ends of said stack, spreading said severed portions during said stacking thereby providing a gap in each said stack layer between the severed ends of said severed stack layer portions, winding magnetic strip material into a substantially rectangular spiral coil having opposite short sides and opposite long legs, severing said spiral coil across its opposite short sides to produce a plurality of substantially U-shaped flatwise bent lamination layers each having a leg portion, a minor end portion and a major end portion of a length greater than the length of the minor portion, forming of said U-shaped layers a pair of substantially U-shaped bundles of lamination layers, alternately reversing the relative positioning of said U-shaped layers during forming of said bundles to position alternate major end portions at opposite ends of the bundles, whereby the bundles include staggered length end portions, positioning said bundles in side-by-side inner edge abutment, successively inserting said major end portions in said stack layer gaps and abutting said minor end portions against edge portions of uninterrupted stack portions opposite to said severed portions, and abutting said severed ends against the side edges of said inserted major end portions.

7. In a method of fabricating cores for transformers, the steps including winding magnetic strip material into a keystone-shaped coil comprising a plurality of continuously interconnected lamination layers, severing said coil across the middle of and perpendicular to the lesser short side of said coil to produce a plurality of nested, independent, lamination layers, each having a severed portion, the remainder of each said severed layer being uninterrupted, unnesting said independent lamination layers, stacking said unnested layers into a substantially rectangular stack with said severed layer portions alternately positioned at opposite ends of said stack, spreading said severed portions during said stacking thereby providing a gap in each said stack layer between the severed ends of said severed stack layer portions, producing a plurality of substantially U-shaped flatwise bent lamination layers each having a leg portion, a minor end portion and a major end portion of a length greater than the length of the minor portion, forming of said U-shaped layers a pair of substantially U-shaped bundles of lamination layers, alternately reversing the relative positioning of said U-shaped layers during forming of said bundles to position alternate major end portions at opposite ends of the bundles, whereby the bundles include staggered length end portions, positioning said bundles in side by side inner edge abutment, successively inserting said major end portions in said stack layer gaps and abutting said minor end portions against edge portions of uninterrupted stack portions opposite to said severed portions, and abutting said severed ends against the side edges of said inserted major end portions.

References Cited in the file of this patent

UNITED STATES PATENTS

| | | |
|---|---|---|
| 2,456,459 | Somerville | Dec. 14, 1944 |
| 2,489,625 | Dornbush | Nov. 29, 1949 |
| 2,558,110 | Stein | June 26, 1951 |
| 2,689,396 | Vienneau | Sept. 21, 1954 |